R. P. GUILEY.
COMBINED OZONE GENERATOR AND INHALING APPARATUS.
APPLICATION FILED MAR. 14, 1910.
996,850.
Patented July 4, 1911.
2 SHEETS—SHEET 1.
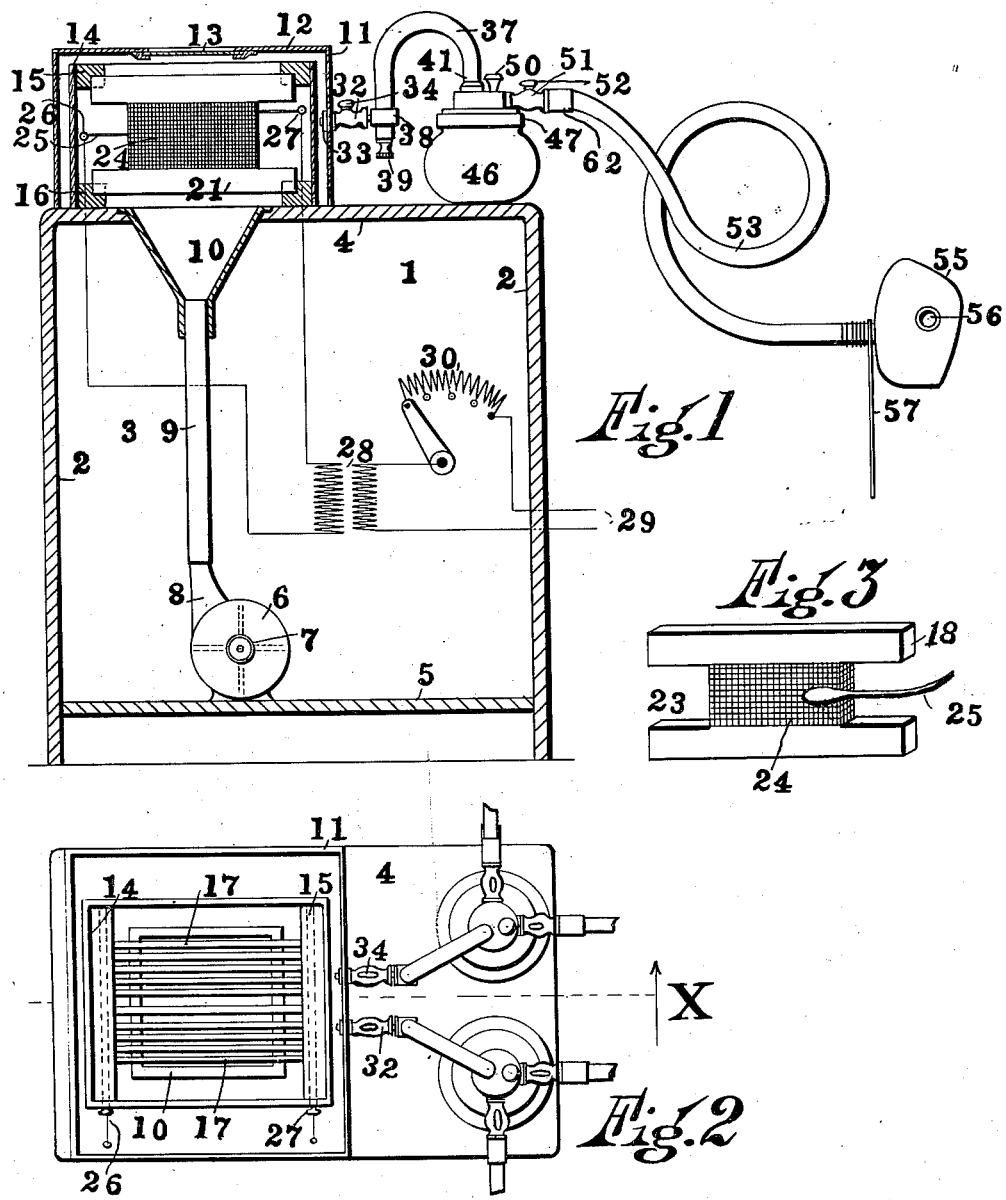
Witnesses:
Austin B. Hanscom
Glenara Fox
INVENTOR—
Robert P. Guiley,
By C. E. Humphrey
ATTORNEY.

R. P. GUILEY.
COMBINED OZONE GENERATOR AND INHALING APPARATUS.
APPLICATION FILED MAR. 14, 1910.

996,850.

Patented July 4, 1911.

2 SHEETS—SHEET 2.

Witnesses:
Austin B. Hanscom
Glenara Fox

INVENTOR—
Robert P. Guiley,
By C. E. Humphrey.
ATTORNEY.

UNITED STATES PATENT OFFICE.

ROBERT P. GUILEY, OF AKRON, OHIO.

COMBINED OZONE GENERATOR AND INHALING APPARATUS.

996,850.   Specification of Letters Patent.   Patented July 4, 1911.

Application filed March 14, 1910. Serial No. 549,239.

*To all whom it may concern:*

Be it known that I, ROBERT P. GUILEY, a citizen of the United States, residing at Akron, in the county of Summit and State of Ohio, have invented new and useful Improvements in Combined Ozone Generators and Inhaling Apparatus, of which the following is a specification.

This invention relates to machines for generating and supplying ozone to patients as a means for treating certain diseases by inhalation and one of the objects of the invention is to provide suitable supporting means for the mechanism employed in generating and administering ozone.

The invention contemplates providing a suitable cabinet to contain means for generating an electric current and for supporting an ozone generator operated by said electric current, said cabinet provided with means for blowing the generated ozone into tubular connections from whence it is withdrawn through a mouthpiece constructed for administering the same.

The invention contemplates providing the tubular conducting means for the ozone with an oil bath through which the ozone is caused to pass in its passage, to remove therefrom any harshness or deleterious matters contained therein, to the end that the user of the device is not exposed to the danger of strangulation by the inhalation of free unrefined ozone.

The invention further contemplates providing the tubular conducting means for conducting the ozone from the generator to the mouth-piece with a trap for preventing the escape of any oil from the bath to the generator during the use of the same.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 4:
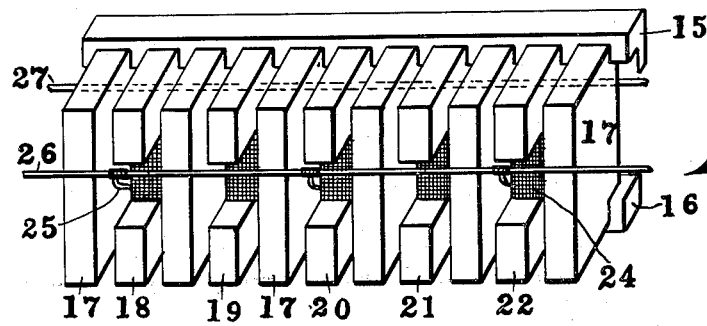
Figure 5:
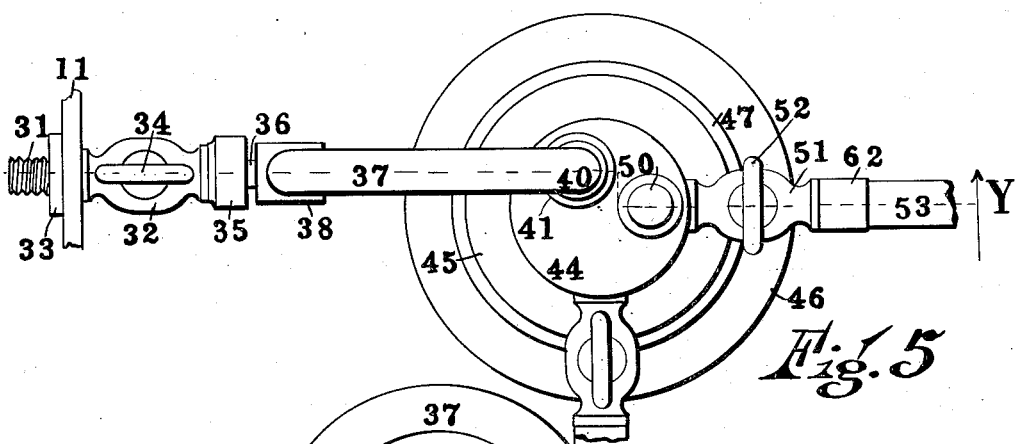
Figure 6:
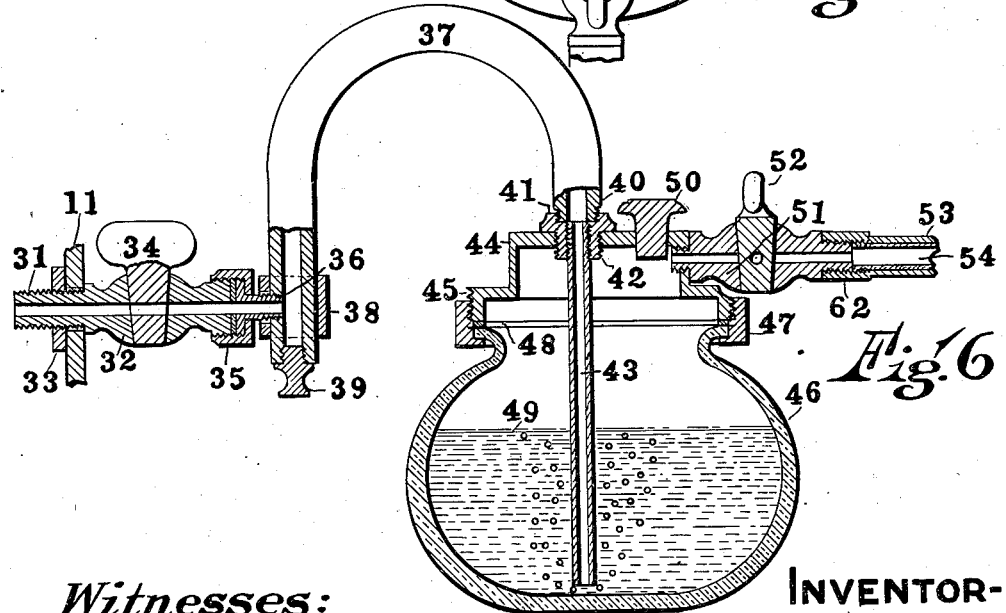

In the drawings in which similar reference numerals indicate like parts in the different figures: Figure 1 is a view in vertical, central section on line X of Fig. 2 of an ozone machine embodying this invention. Fig. 2 is a plan. Fig. 3 is a perspective view of one of the units employed in the ozone generator. Fig. 4 is a perspective view of the ozone generator complete. Fig. 5 is an enlarged plan view of a portion of the tubular conducting means employed for conducting the ozone from the generator to the mouthpiece; and, Fig. 6 is a view in vertical, central section on line Y of Fig. 5.

I prefer to provide my improved ozone machine with a cabinet 1 constituting means both for holding and protecting the generator and administering mechanisms for using the ozone, and this cabinet comprises end walls 2, 2, side walls 3 and a top 4. Within the cabinet is a horizontal partition 5 constituting a floor for the same. Preferably mounted within the cabinet 1 and on the floor 5 is a fan 6 adapted to be driven by a motor or by a belt running on a pulley 7 for constantly furnishing a current of air. This fan is provided with an outlet 8 connected with a pipe 9, the upper end of which is provided with a flaring discharge member 10 positioned in a suitable opening in the top 4 of the cabinet 1.

Mounted on the top 4 and surrounding the open end of the discharge 10 is a hollow box 11 provided with a cover 12, preferably having a portion thereof provided with an opening closed by a sheet of glass 13 to afford means for the inspection of the interior of the box at the desire of user. Mounted within the box 11 is a frame 14 having both the top and bottom open and provided with a suitably-supported transversely-extending pair of bars 15 near the top thereof and a pair of lower bars 16 near the bottom thereof. These bars are each provided with a series of alined notches spaced apart on their inner opposing faces to hold plates of glass of which the ozone generator is built. The generator comprises insulating plates of glass 17 each having the corners thereof inserted in the alined recesses of the pairs of bars 15 and 16 and alternating with the plates 17 is a second series of plates numbered 18, 19, 20, 21 and 22. The construction of the plates 18–22 is shown best in Fig. 3, wherein it will be noted that these plates are each provided with inwardly-extending notches 23 in their ends, the medial portion thereof between the notches covered with one or more layers of wire cloth 24 to which is secured a terminal 25 of a current-conducting wire. Extending transversely through the frame 14 and on opposite sides of the glass plates therein are wires 26 and 27, the wire 26 on one side of the plates being connected through the medium of suitable terminals 25 with the wire cloth on the units 18, 20 and 22, and the wire 27 on the opposite side of the plates is connected by terminals (not shown) with the wire cloth on the units 19 and 21. The wires 26 and 27 are suitably electrically-connected with a transformer 28 which generates a high tension current by means of a current conducted thereto by a low voltage circuit 29 provided with a rheostat 30. The transformer 28 and rheostat 30 are preferably suitably mounted within the cabinet 1 and the high tension current wires connected with the wires 26 and 27 and from thence the current passes through the terminals to the units 18–22 on which are mounted the wire cloth, causing the arcing of the current through the interposed insulator plates 17, in doing which ozone is generated. The glass units 18–22 are each spaced a slight distance from the insulating members placed between them, so that the current of air from the fan 6 may pass between the members constituting the ozone generator and drive the ozone generated thereby outwardly from the device by means to be now described.

The side walls of the box 11 are provided with a plurality of apertures in which are mounted the threaded shank ends 31 of valve casings 32 which are adapted to be locked in place by nuts 33. Each of the valve casings 32 is provided with a valve 34 and the opposite end thereof is preferably exteriorly-threaded to receive an interiorly-threaded coupling member 35, mounted on one end of a headed exteriorly-threaded nipple 36, the opposite end of the latter being secured in a threaded lateral orifice near the lower end of an inverted U-shaped pipe 37. Inclosing the U-shaped pipe 37 and also suitably-apertured to receive the threaded nipple 36 is a joint covering member 38. The lower end of the inverted U-shaped pipe 37 extends below said orifice to constitute a trap and is provided at its terminus with interior threads to receive a threaded plug 39 detachably-mounted therein. The opposite end 40 of the inverted U-shaped pipe 37 is shorter and is preferably exteriorly-threaded to enable it to be seated and secured in an interiorly-threaded socket in a member 41 which is provided with an exteriorly-threaded stem 42 and said stem is also provided with a vertically-threaded central aperture communicating with said recess. Mounted in the threaded aperture is a depending pipe 43. The member 41 is mounted in a threaded aperture in a cap 44 provided with a depending, enlarged, exteriorly-threaded flange 45 mounted on the top of a preferably transparent glass receptacle 46 by means of a coupling member 47. Between the receptacle 46 and the lower depending flanged portion 45 of the cap may be placed a washer 48 to prevent leakage, if desired. Within the glass receptacle 46 is a bath 49 of oil into which the depending pipe 43 dips. The cap 44 is provided with a filling opening normally adapted to be closed by a closure plug 50. The lateral wall of the cap 40 is provided with a plurality of threaded openings each of which is adapted to receive the shank of a valve casing 51 provided with a valve 52 and with the interior of said valve casing in open communication with the interior of said receptacle 46. The outer end of each valve casing 51 is reduced and threaded to receive a coupling member 62 by which a flexible hose 53 provided with a lining 54 of a material normally unaffected by ozone is attached to the casing 51 and with its inner end in open communication therewith. The interior of the hose 53 is provided with a lining 54 of a material capable of resisting the deteriorating effects of ozone generated by the device. The outer free end of the hose 53 is connected with a mouth-piece 55 provided with an exhaust opening 56 and a handle 57.

In operation, a current of electricity, preferably of low voltage, is passed through the circuit 29 and its strength is regulated by means of the rheostat 30. The function of the current in the circuit 29 is to produce in the circuit which is connected with the terminals 26 and 27 a high tension current of electricity, which is in turn carried from the wires 26 and 27 by the terminals 25 to the alternating units constituting the ozone generator, from whence the current of air from the fan passing between the glass plates or units of the generator carries it upwardly and outwardly through the valve casings 32 and nipples 36 to the inverted U-shaped pipes 37 to the interior of each receptacle 46, from which it emerges through the lower terminus of the pipe 43 passing through the oil bath contained in the receptacle and from whence it bubbles up through the oil, as shown in Fig. 6, during which movement the harsh and deleterious condition thereof is modified so as to render the same safe and harmless in use. After passing upwardly through the oil bath 49 the ozone is conveyed through each valve casing 51 and hose 53 to the mouth-pieces 55 and there inhaled by the patient.

In constructing the device I prefer to use at least two receptacles for the oil, each of which is supplied with ozone from the generator and to provide for each receptacle a plurality of tubular conducting means each supplied with a mouth-piece so as to render the device available for the simultaneous treatment of a number of patients if desired, or equally efficacious for use on a single patient.

It will be obvious of course that where only one or a portion of the total number of mouth-pieces are used, the tubular connections leading to the others may be closed through the medium of the valves 52, and if it is desired to cut off one receptacle 46 from communication with the ozone generator, the valve 34 in the tubular connection communicating with that particular receptacle is closed. If for any reason any oil from the oil bath 40 is forced upwardly into the pipe 37 it will descend into the trap which is formed by the lower terminus of the longer end of the pipe 37 and is removed therefrom by the withdrawal of the closure plug 39 and consequently is not driven through the nipple 36 and valve casing 32 into the generator itself.

I claim:

1. A device of the class described comprising a hollow cabinet provided with an opening in the upper wall thereof, a flaring discharge member positioned in said opening, a fan for creating a current of air, tubular means for conducting a current of air from said fan to said flaring discharge member, an ozone generator positioned over the opening in the upper wall of said cabinet, a casing for said ozone generator the bottom of which is open to permit said current of air to enter the interior of said ozone generator, tubular means for establishing communication between the interior of said casing and a mouth-piece and an oil bath interposed in said tubular means for purifying the ozone driven from said casing, substantially as described.

2. A device of the class described comprising an ozone generator, means for passing a current of air therethrough to remove the ozone therefrom, a receptacle containing an oil bath, tubular conducting means extending from said generator and dipping in said oil bath embodying an inverted U-shaped tube, one end of which is provided with a lateral opening communicating with said generator, the lower portion of said end constituting an oil trap provided with a removable closure device, flexible means for withdrawing ozone from said receptacle above said oil bath and a mouth-piece for said flexible conducting means.

3. A device of the class described comprising an ozone generator, means for passing a current of air therethrough to remove the ozone therefrom, a receptacle containing an oil bath, a cover for said receptacle provided with an aperture, an inverted U-shaped pipe disposed in said aperture within the interior of said receptacle, a pipe communicating with said aperture and dipping in said oil bath, the opposite end of said inverted U-shaped pipe provided with a lateral opening near the lower end thereof, tubular conducting means extending from said lateral aperture to said generator, the lower portion of the apertured end of said U-shaped pipe constituting an oil trap, a removable closure device for said oil trap, flexible means for withdrawing ozone from said receptacle above said oil bath and a mouth-piece for said flexible conducting means.

In testimony whereof I have hereunto set my hand in presence of two subscribing witnesses.

ROBERT P. GUILEY.

Witnesses:
L. R. MILLER,
GEO. A. ZEIGLER.